US007660477B2

(12) United States Patent
Wales et al.

(10) Patent No.: US 7,660,477 B2
(45) Date of Patent: Feb. 9, 2010

(54) MULTIPLE IMAGE ARTIFACT CORRECTION OF IMAGES FOR A DISPLAY HAVING A PARTIALLY-SILVERED SURFACE

(75) Inventors: Richard T. Wales, Sunnyvale, CA (US); Philip R. Graham, Milpitas, CA (US); Wen-hsiung Chen, Sunnyvale, CA (US); William B. May, Jr., Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 718 days.

(21) Appl. No.: 11/363,920

(22) Filed: Feb. 28, 2006

(65) Prior Publication Data

US 2007/0200956 A1 Aug. 30, 2007

(51) Int. Cl.
*G06K 9/40* (2006.01)
*H04N 5/00* (2006.01)
*G09G 5/00* (2006.01)

(52) U.S. Cl. ........................ 382/254; 348/614; 345/647

(58) Field of Classification Search ................ 382/167, 382/174, 254, 274, 275, 312; 345/647; 348/614, 348/832; 353/28, 77; 356/300, 521; 358/504, 358/515; 359/350
See application file for complete search history.

(56) References Cited

U.S. PATENT DOCUMENTS 4,541,688 A * 9/1985 Watt et al. .................... 359/350
4,969,732 A * 11/1990 Wright et al. ................. 353/77
5,202,744 A * 4/1993 Louis .......................... 356/73
6,097,892 A * 8/2000 Saito ........................... 396/51
6,703,988 B1 3/2004 Fergason ........................ 345/6
6,935,747 B2 * 8/2005 Westort et al. ................ 353/28
7,120,309 B2 * 10/2006 Garcia ........................ 382/275
7,281,805 B2 * 10/2007 Hasegawa .................... 353/77
7,333,216 B2 * 2/2008 Wegmann et al. ........... 356/521
7,509,665 B2 * 3/2009 Takagi et al. .................. 725/72

OTHER PUBLICATIONS

"DCRe: Digital Cinema Reality Engine," Whitepaper, Trident Digital Media, Inc., Sunnyvale, CA, Preliminary Version 1.0, Nov. 26, 2003. Downloaded Oct. 14, 2005. Available online at http://www.tridentmicro.com/download/DCRe_whitepaper.pdf.

(Continued)

*Primary Examiner*—Kanji Patel
(74) *Attorney, Agent, or Firm*—Dov Rosenfeld; INVENTEK

(57) ABSTRACT

An apparatus, a method and a computer program product for correcting image data for the presence of a ghost image. The image data is for acceptance by a device that includes a partially-silvered finite-thickness reflector or similar element to provide a reflection of an image for display. The ghost image is a shifted, attenuated version of the image data. The method includes subtracting a first correction term from the image data, the first correction term being a shifted and attenuated version of the image data, the shift being the same as that between the image data and the ghost image, and the attenuation matching the attenuation of the ghost image caused by the device. The processed image data is input to the device. For a small enough attenuation of the ghost image, substantially no ghost image of the image data is displayed by the device.

14 Claims, 4 Drawing Sheets

OTHER PUBLICATIONS

Bennett Liles, "Projector Technologies," *Sound & Video Contractor* Magazine, Jul. 1, 2004. Downloaded Oct. 14, 2005. Available online at http://www.svconline.com/mag/avinstall_projector_technologies/index.html.

W. Sung, Y. Ahn and E. Hwang, "VLSI Implementation Of An Adaptive Equalizer For ATSC Digital TV Receivers," *Journal of VLSI Signal Processing Systems*, vol. 40, Issue 3, Jul. 2005, pp. 301-310. Downloaded Oct. 14, 2005. Available online at http://sips03.snu.ac.kr/pub/journal/j_15.pdf.

* cited by examiner

MULTIPLE IMAGE ARTIFACT CORRECTION OF IMAGES FOR A DISPLAY HAVING A PARTIALLY-SILVERED SURFACE

BACKGROUND

This invention is related to image processing, and in particular to a method to correct for artifacts related to having a beam-splitter in the image path, and to a method to correct for multiple images—so called ghost images—that may appear as a result of the beam-splitter.

Electronic image display devices that use a beam splitter are known and commonly used. For example, common LCD projection displays use one or more beam splitters, as do projection displays that provide a viewer with a 3D image that has depth, typically aimed at three-dimensional (3D) telepresence systems.

Beam splitters typically use a partially-silvered glass element so that one image is transmitted through the glass, and another is reflected by the partially-silvered surface, typically the front surface.

With such a device, there is a chance that there is also reflection by the back surface of the glass. Coatings are commonly used to minimize such reflections. However, such multiple image artifacts, also called "ghost image" artifacts still may appear.

Thus, in beam-splitting applications, or in any application using a device that has a partially-silvered finite-thickness reflector to provide a reflection of an image for a display image, there is a chance that a secondary incidental reflection appears in the output.

FIG. 1 shows an example of how multiple image artifacts are introduced by secondary reflection in beam splitting applications that use a beam splitter or any other partially-silvered element to project a reflection of an image. FIG. 1 shows, in schematic form, an exemplary display 100 that includes a partially-silvered glass reflector 101 with a front surface 103 and a back surface 105. A digital image is converted to light in the display. For simplicity, this is shown as light image generator 107. A beam 111 of the image from light generator 107 is shown incident on the front surface. The principal intended reflection 113 in this application appears to a viewer 121 and comes from the front surface 103 of the glass. However, a secondary reflection 115 can come from the rear surface 105 side of the glass, adding a "ghost" of the displayed image on top of itself, spatially offset from the intended image. This secondary ghost image distorts the observed projected image from what was originally displayed, thereby interfering with the accuracy of the reflected image.

The following models the process. Assuming the digital content prior to the display is represented by X(i, j) as shown in FIG. 1, where i is the vertical dimension on the drawing sheet, and also the direction of the offset in the ghost reflection, and j the horizontal dimension perpendicular to the plane of the drawing. The coordinates i and j are expressed herein scaled to be in the same scale as an image appearing to the viewer 121. That is, any and all scaling, inversions, attenuation, etc., are incorporated into the representation X(i, j), so that if no ghost artifact was present, an image X(i, j) appears to the viewer 121. How to so incorporate all the scaling, inversions, attenuation, and so forth that occurs in the physical display would be clear to those in the art. As a result of the two surfaces in the reflector 101, the observer 121 sees an image that is the intended reflected image X(i, j) together with the ghost image, made fainter by a factor denoted $\alpha$, and shifted by an amount denoted $\Delta$ in the i direction—what we call the "vertical" direction. Thus, the observer 121 sees an image denoted $X_{observed}(i, j)$, with $$X_{observed}(i,j)=X(i,j)+\alpha X(i+\Delta,j),$$

where $\alpha$ X(i+$\Delta$, j) represents the "ghost" image generated by the secondary reflection, $\Delta$ represents the content shift introduced by the thickness of the glass used by the reflector, and a represents the attenuation of the secondary reflection relative to the primary reflection.

There is a need in the art for a method and for a computer program product to remove the ghost image—the $\alpha$ X(i+$\Delta$, j)—so that the observer can see an intended image denoted by X(i, j).

SUMMARY

One aspect of the present invention is an image processing method that includes subtracting an attenuated copy of the intended display image from the image itself at an offset to correct for the presence of an unintended additional image—a ghost image that results from reflection by one of the surfaces, e.g., the rear surface of a partially-silvered finite-thickness reflector or similar element in a beam-splitting display system. The finite-thickness reflector is made of a substantially transparent material, e.g., glass. The offset is in the same direction as the ghost image is shifted from the intended display image.

In one aspect there is provided a method of correcting image data for the presence of a ghost image. The image data is for acceptance by a device that includes the partially-silvered finite-thickness reflector or similar element to provide a reflection of an image for display. The ghost image is a shifted, attenuated version of the image data. The method includes processing to produce processing image data, the processing including subtracting a first correction term from the image data. The first correction term being a shifted and attenuated version of the image data, with the shift being the same as that between the image data and the ghost image, and the attenuation matching the attenuation of the ghost image caused by the device. The processed image data is input to the device. For a small enough attenuation of the ghost image, substantially no ghost image of the image data is displayed by the device.

In one embodiment, the processing further includes correcting using a second correction term for the ghost image resulting from the first correction term that is subtracted from the image data.

In yet another embodiment, the processing further includes correcting for the ghost images resulting from applying further correction terms.

In one embodiment, the method further includes calibrating the device to determine the shift between the image data and the ghost image produced by the device, and the attenuation of the ghost image caused by the device.

In another aspect, there is provided a computer-readable carrier medium carrying instruction that when executed by at least one processor of a processing system cause the processors to implement a method, e.g., a version of the above-described method of correcting digital image data for the presence of a ghost image when the image data is accepted by a device that includes a partially-silvered finite-thickness reflector or similar element to provide a reflection of an image for display and that produces the ghost image.

In another aspect, there is provided an apparatus for correcting image data for the presence of a ghost image, the image data being for acceptance by a device that includes a partially-silvered finite-thickness reflector or similar element to provide a reflection of an image for display, the ghost image being a shifted and attenuated version of the image data. The apparatus includes means for processing the image data to produce processed image data, the processing by the means for processing, including subtracting a first correction term from the image data, the first correction term being a shifted and attenuated version of the image data, the shift being the same as that between the image data and the ghost image, and the attenuation matching the attenuation of the ghost image caused by the device. The apparatus further includes means for providing the processed image data to the device. As in the method versions described herein, for a small enough attenuation of the ghost image, substantially no ghost image of the image data is displayed by the device.

Other aspects, features, and advantages will become clear from the description and the claims provided herein.

DETAILED DESCRIPTION

The invention describes an image processing method and a computer program product to cause a processor to implement the method. The method includes subtracting, prior to display, an attenuated copy of the intended display image obtained from the image itself at an appropriate offset in the ghost image translation direction—the vertical direction in the example herein—to correct for the otherwise presence of an undesired additional image—the ghost image—that results from reflection by one of the surfaces, e.g., the rear surface of a partially-silvered glass reflector or similar element in a beam-splitting display system.

Figure 1:
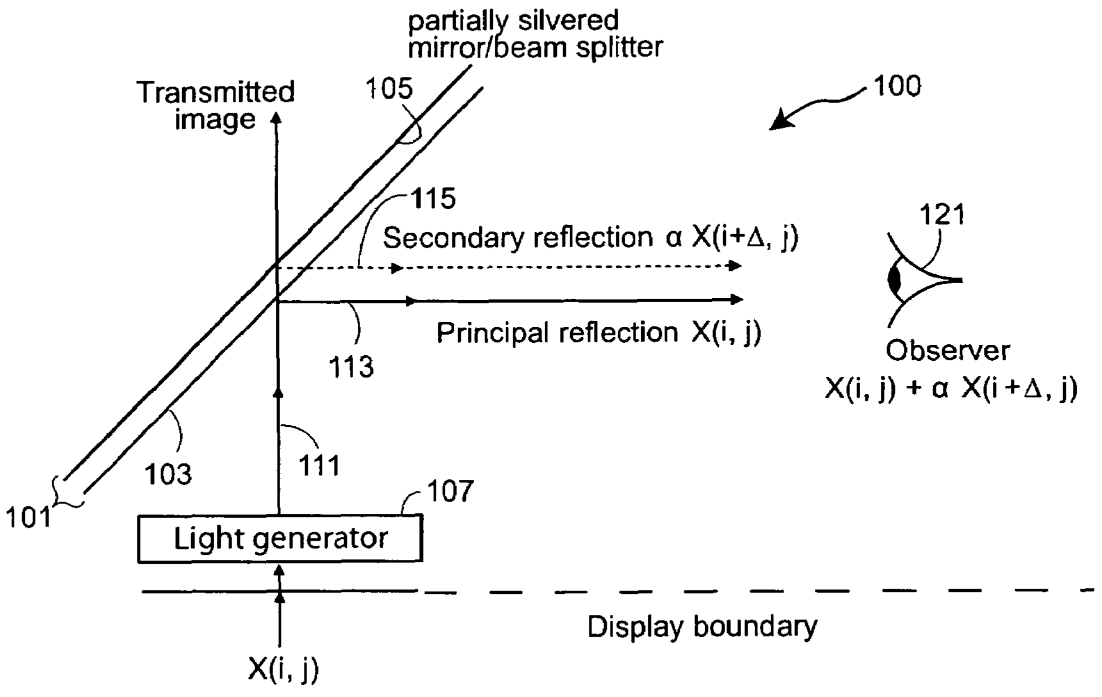
FIG. 1 shows a schematic example of how a multiple image, also called an image with a "ghost image" artifact is introduced by a secondary reflection in a device that has partially-silvered element to project a reflection of an image, such as a beam splitter.
Figure 2:
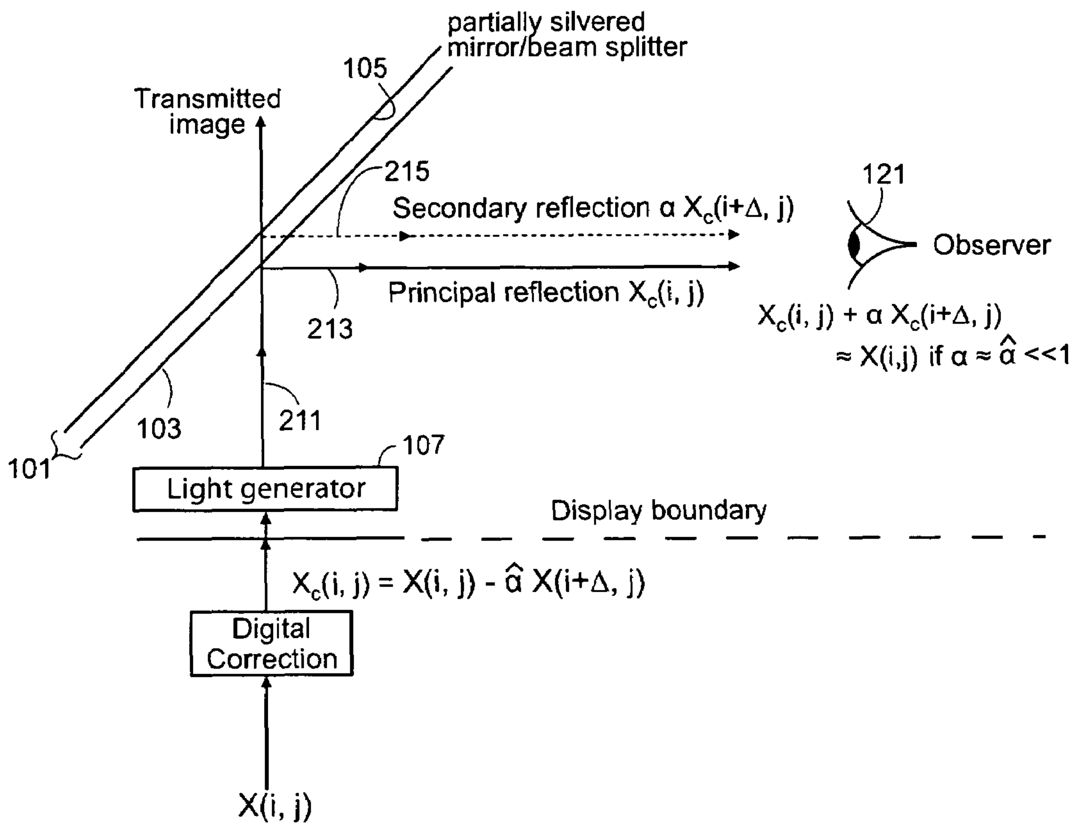
FIG. 2 shows a simplified block diagram that includes an image processing aspect of the present invention that includes processing the image prior to display to correct for the multiple image ("ghost image") artifact.

FIG. 2 shows a simplified schematic of the display 100 includes an image processing block that accepts the original image 111 denoted X(i, j) and processes the image to remove an approximation of what is expected to be the ghost image, so that the pre-corrected image, denoted Xc(i, j) and provided to the display causes the final image provided to the viewer 121 to not include the multiple image ("ghost image") artifact. In FIG. 2, a beam of the image post-processing is shown as 211 incident on the front surface of the mirror. The beam 213 is the main reflection, while 215 is the reflection from the rear surface of the finite thickness mirror.

Thus, on embodiment includes digitally modifying the source image that is being displayed.

Figure 3:
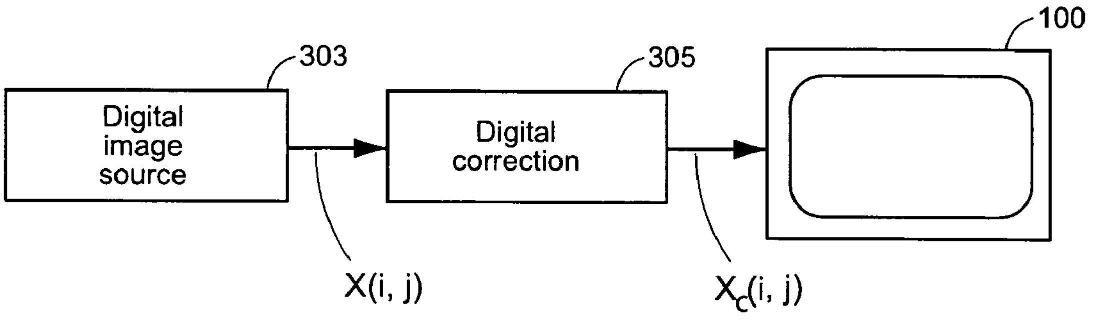
FIG. 3 shows a simplified block diagram of one arrangement of processing image data for input to the display device.

In one application, the image data to be displayed is provided in digital form for display. FIG. 3 shows a source 303 of digital image data, which may be any image data source, including a processor that generates image data for display, a digital television decoder that generates a time sequence of digital image frames for display, and so forth. The two dimensional representation of the intensity of the digital image is denoted, as above, by X(i, j), where i and j take into account scaling that occurs in the display, so that a "perfect" display would provide a display of X(i, j) to a viewer. For purposes of explanation suppose that the ghost images are versions of X(i, j) that are displaced by an amount Δ in the direction of the first—the i—dimension. How to modify for the displacement being in any other direction would be clear and straightforward to those in the art.

In one embodiment, the method includes a digital correction unit 305 digitally processing the image data for correction for the reflection to generate corrected data, denoted $X_c(i, j)$ for display prior to the data being accepted by the display 100. The processing of unit 305 compensates for the reflected image. In the case that the source 303 of digital image data is a source of video data that includes a time sequence of frames, each an image, because the "ghost image" is generated in the same manner in every frame, the digital processing of unit 305 is applied to each frame independently of other frames. There is no need to worry about any interframe relationship.

In a first embodiment, the processing of unit 305 includes subtracting an estimate of the reflected image from the source image data, that is, subtracting a shifted and attenuated version of the source image from the source image, with the shift the same as that producing the ghost image, and the attenuation to match the attenuation of the ghost image caused by the display 100. Eq. 1 describes the operation of first embodiment processing unit 305:

$$X_c(i,j)=X(i,j)-\alpha X(i+\Delta,j), \tag{1}$$

FIG. 2 shows such a processing in a simplified form. As a result of the display, the image displayed to the viewer 121 is:

$$\begin{aligned} X_{observed}(i,\ j) &= X_c(i,\ j) + \alpha X_c(i+\Delta,\ j) \\ &= X(i,\ j) - \alpha X(i+\Delta,\ j) + \\ &\quad \alpha[X(i+\Delta,\ j) - \alpha X(i+2\Delta,\ j)] \\ &\approx X(i,\ j) \text{ when } \alpha^2 \text{ is negligible, e.g., when } \alpha \ll 1. \end{aligned}$$

Note that there is a term $(\alpha^2)X(i+2\Delta, j)$ that is being ignored. For this to work reasonably well, the strength of the secondary reflection α is a relatively small value. Such for a small enough attenuation of the ghost image, substantially no ghost image of the image data is displayed by the device 100. In our experience, the first embodiment works reasonably well when the relative strength of the secondary reflection, α is approximately less than 0.1.

In a second embodiment, the processing of unit 305 includes correcting for the ghost image resulting from the correction term that is subtracted from the main image. The processing of unit 305 then includes correcting the source image using a first correction term, being an estimate of the ghost image of the source, the first correction term therefore being a subtracted shifted and attenuated version of the source image with the shift the same as that producing the ghost image and in the same direction, and the attenuation to match the attenuation of the ghost image caused by the display 100, and further correcting the source image using a second correction term, the second correction term being an estimate of the ghost image of the first correction term. Thus, the correction further includes subtracting an estimate of the ghost image produced by the correction term, that is, adding a shifted and more attenuated version of the source image, with the shift twice that produced in the ghost image and in the same direction, and the attenuation is the square of that of the first subtracted image. Eq. 2 describes the operation of first embodiment processing unit 305:

$$X_c(i,j)=X(i,j)-\alpha X(i+\Delta,j)+(\alpha^2)X(i+2\Delta,j) \quad (2)$$

As a result of the display, the image displayed to the viewer 121 is:

$$\begin{aligned} X_{observed}(i,j) &= X_c(i,j)+\alpha X_c(i+\Delta,j) \\ &= X(i,j)-\alpha X(i+\Delta,j)+ \\ &\quad (\alpha^2)X(i+2\Delta,j)+ \\ &\quad \alpha\begin{bmatrix} X(i+\Delta,j)-\alpha X(i+2\Delta,j)+ \\ (\alpha^2)X(i+2\Delta,j) \end{bmatrix} \\ &\approx X(i,j) \text{ when } \alpha^3 \text{ is negligible} \end{aligned}$$

When the strength of the secondary reflection $\alpha$ is small enough, the term $(\alpha^3)X(i+3\Delta, j)$ becomes negligible and the observed image is X(i, j) as intended.

Notice that each correction term introduced by the processing of 305 introduces a ghost of the correction term. A general embodiment of the processing of the digital correction unit 305 provides n'th order correction including correcting using a first correction term for the ghost image of the source image, then correcting using a second correction term for the ghost image of the first correction term, and so forth. In the n'th order case, the final correction is a correction using another correction term, being an estimate of the ghost image of the (n−1)'th correction term. The n'th order correction of unit 305 can be represented by the Eq. 3 as follows:

$$X_c(i,j)=X(i,j)-\alpha X(i+\Delta,j)+\alpha^2X(i+2\Delta,j)-\ldots+(-1)^n\alpha^nX(i+n\Delta,j) \quad (3)$$

The observed image resulting from the nth order correction is thereby:

$$\begin{aligned} X_{observed}(i,j) &= X_c(i,j)+\alpha X_c(i+\Delta,j) \\ &= X(i,j)+[(-1)^n][\alpha^{n+1}][X(i+(n+1)\Delta,j)] \end{aligned}$$

If the strength of the reflection $\alpha$ is small the term $[\alpha^{n+1}][X(i+(n+1)\Delta, j)]$ can be omitted and the observed image is:

$$X_{observed}(i,j)\approx X(i,j).$$

Figure 4:
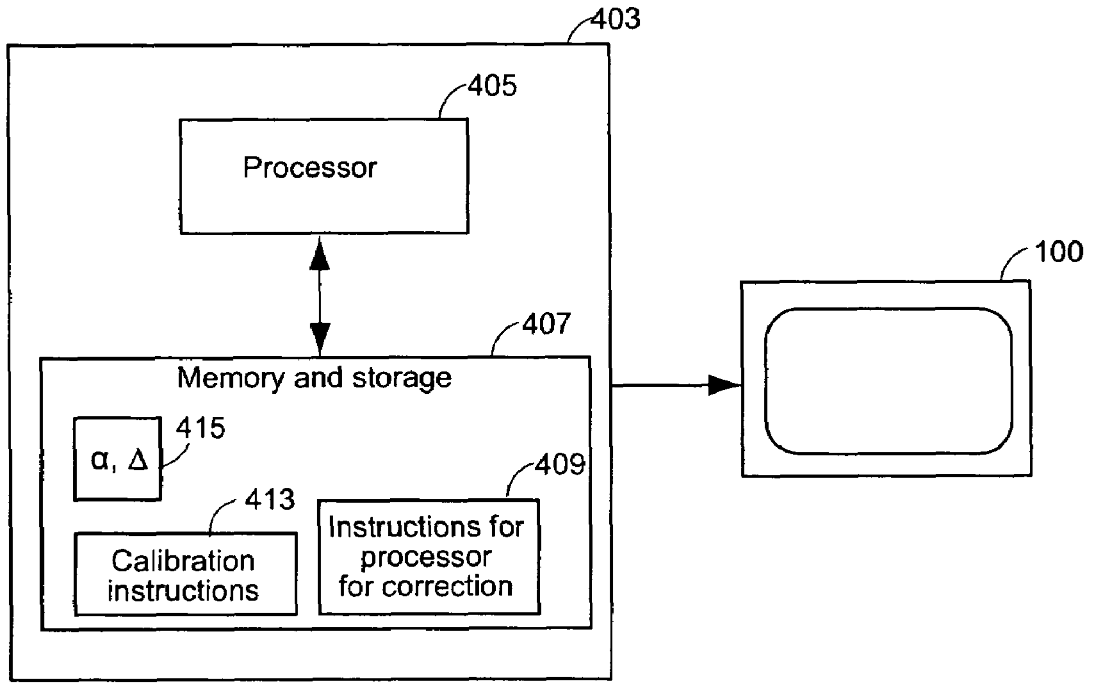
FIG. 4 shows a simplified block diagram of a processing system that includes a carrier medium carrying instructions to cause at least one processor of the processing system, when executing the instructions, to implement one embodiment of processing of image data for input to the display device to correct for the presence of a ghost artifact resulting from using a partially silvered finite-thickness reflection element in a display device.

FIG. 4 shows one implementation of the correction unit 305 in a processing system 403. The processing system includes at least one processor 405 coupled to a memory and storage subsystem 407. Unit 407 in one embodiment includes both ROM and RAM. In another embodiment, unit 407 includes a storage subsystem such as a hard disk, and a memory subsystem that includes RAM and possibly ROM. Other variations also are possible. The method carried out by the correction unit 305 is carried out by a set of instructions 409 that when executed by the at least one processor 405, cause the processor to carry out the correction described above to generate the corrected image data $X_c(i, j)$. One version also includes, stored in the memory and storage unit 405, the parameters 415 for the ghost image shift $\Delta$, and the ghost image attenuation $\alpha$.

The part 409, of memory and storage system 407, that carries the instructions is one implementation of a carrier medium carrying instructions that, when executed by at least one processor 405 of processing system 403, causes the processor to carry out the method of correction described above. The instructions form a computer software program product.

One version of the correction unit 305 is included by the manufacturer in a complete display unit. In such a case, the parameters for the ghost image shift $\Delta$, and the ghost image attenuation $\alpha$ are set at the factory during calibration of the complete display unit.

In another implementation, the correction unit 305 may be separate from the display and designed to work with one of a plurality of devices, each having different parameters. In such a case, the method further includes calibrating the display system to determine the ghost image shift $\Delta$, and the ghost image attenuation $\alpha$. In one embodiment, the calibration method is carried out by a computer program, e.g., by a set of instructions 413 (see FIG. 4) that when executed by the at least one processor 405 causes the processor to carry out a calibration method to determine the parameters 415.

One version of calibration includes generating a line image of a known intensity, the line in the direction perpendicular to the direction of shift of the ghost image, detecting ghost image line in the display, and determining the distance from the detected ghost line image. This determines the ghost image shift $\Delta$. The calibration further includes applying the first order correction as described above in Eq. 1, that is, applying a test image consisting of the line test image with a line positioned at the ghost image location subtracted. The subtracted line has a variable strength. The method includes adjusting the strength of the subtracted line image until, on the display, no ghost image appears at the original ghost image location. This determines the ghost image attenuation $\alpha$.

Other calibration methods alternately may be applied.

Thus has been described a method (and a computer program product) of processing image data aimed at a device that includes a reflecting element that produces a ghost image, in order to eliminate or significantly reduce any ghost images in the final display.

It should be appreciated that in the above description, the scaling that occurs in the display has been incorporated into the mathematical model X(i, j) of the digital image, and how to so incorporate scaling would be clear to one in the art using the actual geometry of the actual device that has the reflecting element 101.

Unless specifically stated otherwise, as apparent from the following discussions, it is appreciated that throughout the specification discussions utilizing terms such as "processing," "computing," "calculating," "determining" or the like, refer to the action and/or processes of a computer or computing system, or similar electronic computing device, that manipulates and/or transforms data represented as physical, such as electronic, quantities into other data similarly represented as physical quantities.

In a similar manner, the term "processor" may refer to any device or portion of a device that processes electronic data, e.g., from registers and/or memory to transform that electronic data into other electronic data that, e.g., may be stored in registers and/or memory. A "computer" or a "computing machine" or a "computing platform" may include one or more processors.

The methodologies described herein are, in one embodiment, performable by a machine which includes one or more processors that accept computer-readable (also called machine-readable) instructions. For any of the methods described herein, when the instructions are executed by the machine, the machine performs the method. Any machine capable of executing a set of instructions (sequential or otherwise) that specify actions to be taken by that machine are included. Thus, a typical machine may be exemplified by a typical processing system that includes one or more processors. Each processor may include one or more of a CPU, a graphics processing unit, and a programmable DSP unit. The processing system further may include a memory subsystem including main RAM and/or a static RAM, and/or ROM. A bus subsystem may be included for communicating between the components. If the processing system requires a display, such a display may be included, e.g., a liquid crystal display (LCD) or a cathode ray tube (CRT) display. If manual data entry is required, the processing system also includes an input device such as one or more of an alphanumeric input unit such as a keyboard, a pointing control device such as a mouse, and so forth. The term memory unit as used herein also encompasses a storage system such as a disk drive unit. The processing system in some configurations may include a sound output device, and a network interface device. The memory subsystem thus includes a carrier medium that carries computer-readable instructions (e.g., software) including instructions for performing, when executed by the processing system, one of more of the methods described herein. Note that when the method includes several elements, e.g., several steps, no ordering of such elements is implied, unless specifically stated. The software may reside in the hard disk, or may also reside, completely or at least partially, within the RAM and/or within the processor during execution thereof by the computer system. Thus, the memory and the processor also constitute a computer-readable carrier medium carrying computer-readable instructions.

In alternative embodiments, the machine operates as a standalone device or may be connected, e.g., networked to other machines, in a networked deployment, the machine may operate in the capacity of a server or a client machine in server-client network environment, or as a peer machine in a peer-to-peer or distributed network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine.

Note that while some diagram(s) only show(s) a single processor and a single memory that carries the computer-readable instructions, those in the art will understand that many of the components described above are included, but not explicitly shown or described in order not to obscure the inventive aspect. For example, while only a single machine is illustrated, the term "machine" shall also be taken to include any collection of machines that individually or jointly execute a set (or multiple sets) of instructions to perform any one or more of the methodologies discussed herein.

Thus, one embodiment of each of the methods described herein is in the form of a computer program that executes on a processing system, e.g., a one or more processors that are part of image correction unit, e.g., in a display. Thus, as will be appreciated by those skilled in the art, embodiments of the present invention may be embodied as a method, an apparatus such as a special purpose apparatus, an apparatus such as a data processing system, or a carrier medium, e.g., a computer program product. The carrier medium carries computer readable instructions for controlling a processing system to implement a method. Accordingly, aspects of the present invention may take the form of a method, an entirely hardware embodiment, an entirely software embodiment or an embodiment combining software and hardware aspects. Furthermore, the present invention may take the form of carrier medium (e.g., a computer program product on a computer-readable storage medium) carrying computer-readable program instructions embodied in the medium.

The software may further be transmitted or received over a network via the network interface device. While the carrier medium is shown in an exemplary embodiment to be a single medium, the term "carrier medium" should be taken to include a single medium or multiple media (e.g., a centralized or distributed database, and/or associated caches and servers) that store the one or more sets of instructions. The term "carrier medium" shall also be taken to include any medium that is capable of storing, encoding or carrying a set of instructions for execution by the machine and that cause the machine to perform any one or more of the methodologies of the present invention. A carrier medium may take many forms, including but not limited to, non-volatile media, volatile media, and transmission media. Non-volatile media includes, for example, optical, magnetic disks, and magneto-optical disks. Volatile media includes dynamic memory, such as main memory. Transmission media includes coaxial cables, copper wire and fiber optics, including the wires that comprise a bus subsystem. Transmission media also may also take the form of acoustic or light waves, such as those generated during radio wave and infrared data communications. For example, the term "carrier medium" shall accordingly be taken to include, but not be limited to, solid-state memories, optical and magnetic media, and carrier wave signals.

It will be understood that the steps of methods discussed are performed in one embodiment by an appropriate processor (or processors) of a processing (i.e., computer) system executing instructions stored in storage. It will also be understood that the invention is not limited to any particular implementation or programming technique and that the invention may be implemented using any appropriate techniques for implementing the functionality described herein. The invention is not limited to any particular programming language or operating system.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment. Furthermore, the particular features, structures or characteristics may be combined in any suitable manner, as would be apparent to one of ordinary skill in the art from this disclosure, in one or more embodiments.

Similarly it should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

In the description provided herein, numerous specific details are set forth. However, it is understood that embodiments of the invention may be practiced without these specific details. In other instances, well-known methods, structures and techniques have not been shown in detail in order not to obscure an understanding of this description.

As used herein, unless otherwise specified the use of the ordinal adjectives “first”, “second”, “third”, etc., to describe a common object, merely indicate that different instances of like objects are being referred to, and are not intended to imply that the objects so described must be in a given sequence, either temporally, spatially, in ranking, or in any other manner.

All publications, patents, and patent applications cited herein are hereby incorporated by reference.

In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. For example, the scope of the expression a device comprising A and B should not be limited to devices consisting only of elements A and B. Any one of the terms including or which includes or that includes as used herein is also an open term that also means including at least the elements/features that follow the term, but not excluding others. Thus, including is synonymous with and means comprising.

Similarly, it is to be noticed that the term coupled, when used in the claims, should not be interpreted as being limitative to direct connections only. The terms “coupled” and “connected”, along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path including other devices or means. “Coupled” may mean that two or more elements are either in direct physical or electrical contact, or that two or more elements are not in direct contact with each other but yet still co-operate or interact with each other.

Thus, while there has been described what are believed to be the preferred embodiments of the invention, those skilled in the art will recognize that other and further modifications may be made thereto without departing from the spirit of the invention, and it is intended to claim all such changes and modifications as fall within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

We claim:

1. A method of correcting image data for the presence of a ghost image, the image data being for acceptance by a device that includes a finite-thickness element with a partially reflecting surface that reflects incident light and passes through some of the incident light to provide a reflection of an image for display, the ghost image being a shifted and attenuated version of the image data, the method comprising:

accepting the image data;

processing the image data to produce processed image data, the processing including subtracting a first correction term from the image data, the first correction term being a shifted and attenuated version of the image data, the shift being the same as that between the image data and the ghost image, and the attenuation matching the attenuation of the ghost image caused by the device; and providing the processed image data to the device, such that, for a small enough attenuation of the ghost image, substantially no ghost image of the image data is displayed by the device.

2. A method as recited in claim 1, wherein the finite-thickness element with a partially reflecting surface that reflects incident light and passes through some of the incident light is a beam splitter.

3. A method as recited in claim 1, wherein the processing further includes correcting using a second correction term for the ghost image resulting from the first correction term that is subtracted from the image data.

4. A method as recited in claim 3, wherein the processing further includes correcting for the ghost images resulting from applying further correction terms.

5. A method as recited in claim 1, further comprising:

calibrating the device to determine the shift between the image data and the ghost image produced by the device, and the attenuation of the ghost image caused by the device.

6. A method as recited in claim 1, wherein the shift between the image data and the ghost image produced by the device, and the attenuation of the ghost image caused by the device are pre-determined.

7. A tangible computer-readable storage medium carrying instructions that when executed by at least one processor of a processing system cause the processors to implement a method of correcting digital image data for the presence of a ghost image when the image data is accepted by a device that includes a finite-thickness element with a partially reflecting surface that reflects incident light and passes through some of the incident light to provide a reflection of an image for display and that produces the ghost image, the method comprising:

accepting the image data;

processing the image data to produce processed image data, the processing including subtracting a first correction term from the image data, the first correction term being a shifted and attenuated version of the image data, the shift being the same as that between the image data and the ghost image, and the attenuation matching the attenuation of the ghost image caused by the device; and providing the processed image data to the device, such that, for a small enough attenuation of the ghost image, substantially no ghost image of the image data is displayed by the device.

8. A tangible computer-readable storage medium as recited in claim 7, wherein the processing further includes correcting using a second correction term for the ghost image resulting from the first correction term that is subtracted from the image data.

9. A tangible computer-readable storage medium as recited in claim 8, wherein the processing further includes correcting for the ghost images resulting from applying further correction terms.

10. A tangible computer-readable carrier medium as recited in claim 7, further comprising instructions that when executed by at least one processor cause at least one processor to implement:

calibrating the device to determine the shift between the image data and the ghost image produced by the device, and the attenuation of the ghost image caused by the device.

11. An apparatus for correcting image data for the presence of a ghost image, the image data being for acceptance by a device that includes a finite-thickness element with a partially reflecting surface that reflects incident light and passes through some of the incident light to provide a reflection of an image for display, the ghost image being a shifted and attenuated version of the image data, the method comprising:

means for accepting the image data;

means for processing the image data to produce processed image data, the processing by the means for processing including subtracting a first correction term from the image data, the first correction term being a shifted and attenuated version of the image data, the shift being the same as that between the image data and the ghost image, and the attenuation matching the attenuation of the ghost image caused by the device; and means for providing the processed image data to the device, such that, for a small enough attenuation of the ghost image, substantially no ghost image of the image data is displayed by the device.

12. An apparatus as recited in claim 11, wherein the processing of the means for processing further includes correcting using a second correction term for the ghost image resulting from the first correction term that is subtracted from the image data.

13. A method as recited in claim 12, wherein the processing of the means for processing further includes correcting for the ghost images further correction terms.

14. A method as recited in claim 11, further comprising:

means for calibrating the device to determine the shift between the image data and the ghost image produced by the device, and the attenuation of the ghost image caused by the device.

* * * * *

UNITED STATES PATENT AND TRADEMARK OFFICE
CERTIFICATE OF CORRECTION

PATENT NO. : 7,660,477 B2
APPLICATION NO. : 11/363920
DATED : February 9, 2010
INVENTOR(S) : Wales et al.

It is certified that error appears in the above-identified patent and that said Letters Patent is hereby corrected as shown below:

In column 2, line 8, kindly change "and a represents" to --and α represents--

Signed and Sealed this

Sixth Day of April, 2010

David J. Kappos

David J. Kappos
*Director of the United States Patent and Trademark Office*

UNITED STATES PATENT AND TRADEMARK OFFICE

CERTIFICATE OF CORRECTION

PATENT NO. : 7,660,477 B2
APPLICATION NO. : 11/363920
DATED : February 9, 2010
INVENTOR(S) : Wales et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1018 days.

Signed and Sealed this

Twenty-eighth Day of December, 2010

David J. Kappos

*Director of the United States Patent and Trademark Office*